2 Sheets--Sheet 1.

C. CROOK.
Harvesters.

No. 5,428. Reissued May 27, 1873.

Witnesses
Alex Mahon
J. B. Thomas

Charles Crook
by A. M. Smith
Attorney

AM. PHOTO-LITHOGRAPHIC CO. N.Y. (OSBORNE'S PROCESS.)

2 Sheets--Sheet 2.
C. CROOK.
Harvesters.
No. 5,428. Reissued May 27, 1873.
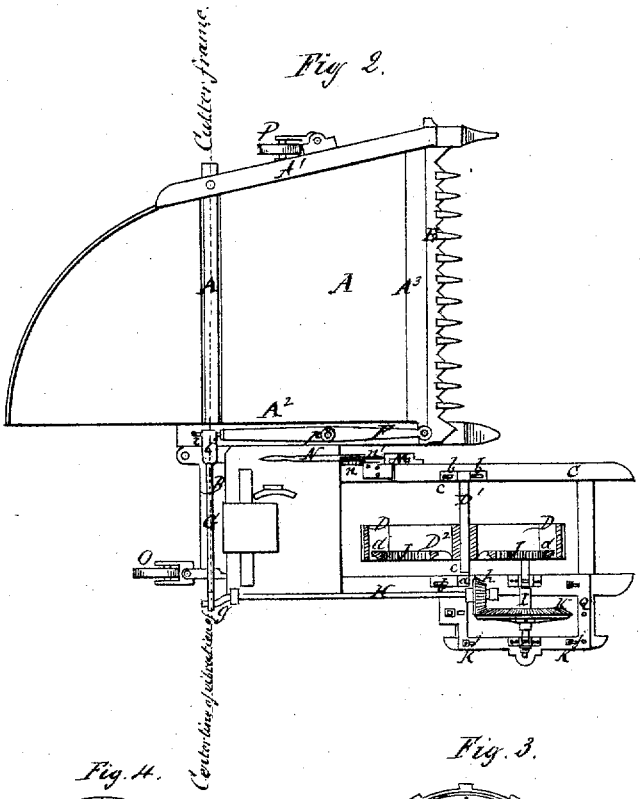
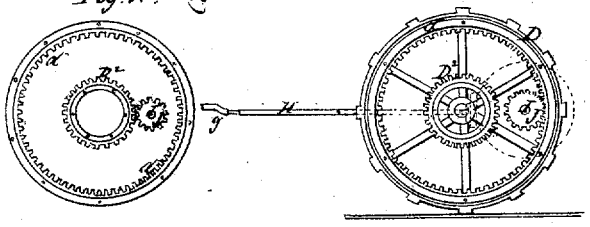
Witnesses
Alex. Mahon
J. F. Thomas
Charles Crook
by A. M. Smith
Attorney
AM. PHOTO-LITHOGRAPHIC CO. N.Y. (OSBORNE'S PROCESS.)

UNITED STATES PATENT OFFICE.

CHARLES CROOK, OF NEW HOPE, PENNSYLVANIA, ASSIGNOR TO MOSES G. HUBBARD.

IMPROVEMENT IN HARVESTERS.

Specification forming part of Letters Patent No. 17,205, dated May 5, 1857; reissue No. 548, dated May 4, 1858; reissue No. 3,393, dated April 20, 1869; extended seven years; reissue No. 5,428, dated May 27, 1873; application filed February 20, 1873.

DIVISION A.

*To all whom it may concern:*

Be it known that I, CHARLES CROOK, of New Hope, in the county of Bucks and State of Pennsylvania, have invented certain new and useful Improvements in Harvesting-Machines, of which the following is a full, clear, and exact description, reference being had to the accompanying drawings, in which—

Figure 1:
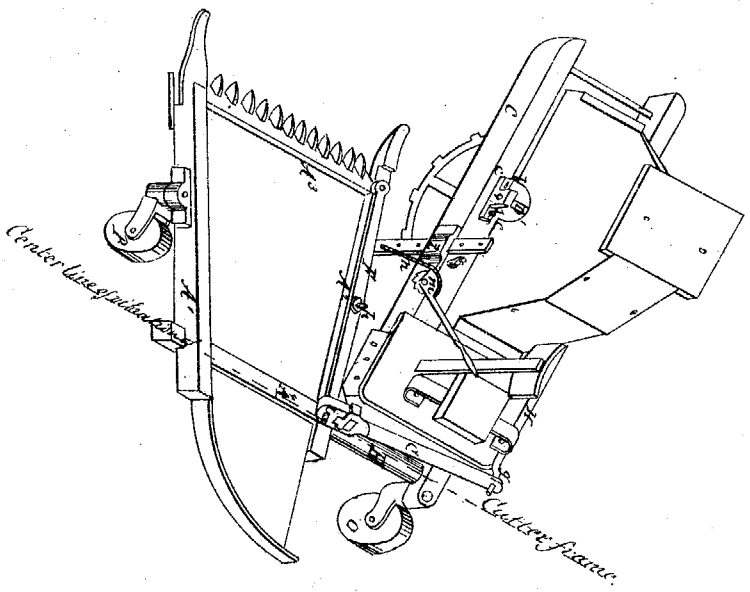
Figure 5:
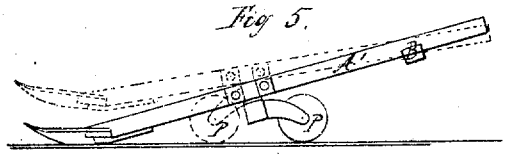

Figure 1 is a perspective view of a mowing and reaping machine, illustrating the improvements; Fig. 2, a ground plan with part of the gearing in section; Figs. 3 and 4, views of the driving-gear; Fig. 5, an end view of the grain side of the cutter-frame.

Similar letters refer to similar parts throughout the several views.

The invention consists in an arrangement of gearing by which the speed of the cutters may be readily changed. A represents the platform attached to the cutter-frame, which is composed of the outside bar $A^1$, the inside bar $A^2$, the front bar $A^3$, and the back bar $A^4$. A rounded continuation, B, of the latter, and, with it, the whole cutter-frame, turns in brackets on the main frame C of the machine. D is the main driving-wheel secured to the shaft D′, which turns in boxes *a a*. These boxes have oblong slots *c c*, through which bolts or screws pass into the main frame, so that the boxes, and, with them, the shaft $D^1$ and its driving-wheel D, may be adjusted at pleasure. To the driving-wheel are secured the gear-wheels *d* and $D^2$, both having teeth adapted to gear into those of the pinion J, which is secured to the end of the shaft I, the latter turning in boxes *e e* attached to a plate, Q, which is secured to the main frame. This plate may be made adjustable by allowing the screws or bolts *k* to pass through oblong slots *j*. It is not necessary, however, that both the boxes *a a* and the plate Q, with its boxes *e e*, should be adjustable. Either one or the other may be permanently secured to the main frame. On the shaft I is a bevel-wheel, K, gearing into the bevel-pinion *h* on the shaft H, which turns in brackets on the main frame, and the end of which is formed into a crank, *g*. To the latter is connected one end of the rod G, the opposite end being connected, by means of a swivel-joint, *i*, to an arm of the lever F, which has its fulcrum on a pin, *p*, attached to the inside bar $A^2$ of the cutter-frame, the opposite end of the lever being pivoted to the cutter-bar E. A caster, O, which may be connected with either the inner or outer corner, supports the rear of the main frame, and the outer end of the cutter-frame is supported on the caster P. To the inside bar $A^2$ of the cutter-frame, and between the center of vibration of the latter and the cutters is jointed the bar M, which passes through and is guided by the staple on the main frame. A lever, N, has its fulcrum on a pin attached to the main frame, and to this lever are secured the segment *m* of a pulley and the ratchet-wheel *n*. To the former is attached the cord or chain *n′*, the lower end of which is connected to the bar M, and the teeth of the ratchet-wheel are adapted to the pawl *o*, which is hinged to the main frame, and which serves to retain the cutter-frame in the position to which it may have been raised by the lever N. In practice it is frequently found necessary to change the speed of vibration of the cutters to adapt them to the condition of the crop to be acted upon, and, at the same time, it is desirable to keep the speed of vibration as low as practicable, because of the jar or strain upon the machine consequent upon a rapid vibration. This change of speed is effected by the employment of two driving-gears, *d* $D^2$, of unequal size, either of which may be used to drive the cutters, at the option of the attendant. The outer end of the swivel-joint *i* turns on the rounded end of the arm of the lever F, and as the inner end of the joint is allowed to turn freely on the end of the connecting-rod G, and as the latter is in close proximity to the center line of vibration of the cutter-frame, it is evident that the cutters may be raised and lowered at pleasure, without disarranging the proper working position of either the rods or the lever, or causing any interruption in the operation of the machine.

From the foregoing description it will be seen that the main frame is supported on the main axle and a caster wheel, O, and the cutting-apparatus is so connected therewith that it can rise and fall relatively to said main frame in moving, and can also be elevated for passing obstructions or adjusted to any desired height for reaping. The bar M, attached to the cutter-frame and passing up through a guide or staple on the main frame, serves to guide and steady the movements of the cutter-frame, which, by means of the tilting-lever N and the connecting-cord or chain, can be readily tilted or raised and lowered when used in reaping. By "tilting" is meant the dropping of the cutting apparatus in such manner that while the whole cutting apparatus is being lowered, the points of the guards shall descend more rapidly than any other portion of the reaping attachment, in order to cut as low as desired and pick up lodged grain with the points of the guards.

What is claimed under this application, as the invention of CHARLES CROOK, is—

1. Two driving-gears of unequal size or diameters for changing the rapidity of vibration of the cutters.

2. A concentric arrangement of two driving-gears of unequal size for changing the rapidity of vibration of the cutters.

3. The combination of changeable gearing permitting a reduction of the speed of the cutters for reaping, with the cutting apparatus of a combined reaping and mowing-machine.

4. A combined reaping and mowing machine, provided with a cutting apparatus which is free to rise and fall relatively to the main frame in mowing, and which can be adjusted to any desired height for reaping, and changeable gearing, permitting a change in the speed of the cutters, for purposes and substantially as set forth.

CHAS. CROOK.

Witnesses:
M. G. HUBBARD,
G. B. NASH.